UNITED STATES PATENT OFFICE.

RUDOLPH BERENDES, OF ELBERFELD, GERMANY, ASSIGNOR TO FARBENFABRIKEN VORM. FRIEDR. BAYER & CO., OF ELBERFELD, GERMANY, A CORPORATION OF GERMANY.

ALKYL ESTERS OF METHYLENE CITRIC ACID.

No. 921,944.      Specification of Letters Patent.      Patented May 18, 1909.

Application filed November 16, 1908. Serial No. 462,911.

*To all whom it may concern:*

Be it known that I, RUDOLPH BERENDES, doctor of philosophy, chemist, citizen of the German Empire, residing at Elberfeld, Kingdom of Prussia, Germany, have invented new new and useful Improvements in Alkyl Esters of Methylene Citric Acid, of which the following is a specification.

My invention relates to the manufacture and production of the hitherto unknown alkyl esters of the methylene citric acid having most probably the following general formula:

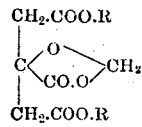

(R meaning an alkyl radical). The esters are obtained by esterification of the methylene citric acid or its salts or its derivatives.

The new esters are valuable therapeutic compounds. They are crystalline powdess soluble with difficulty in water and soluble in alcohol, ether and chloroform. They are tasteless and non-irritant and are valuable remedies for internal and external application.

In order to illustrate my process I give the following examples, the parts being by weight:

Example 1: 10 parts of methylene citric acid are heated to boiling with 40 parts of ethyl alcohol and 2.5 parts of sulfuric acid for several hours at a reflux condenser. The mixture is diluted with water and the ester is crystallized from benzene. It crystallizes in the form of colorless and odorless plates melting at 55° C., soluble with difficulty in water and easily soluble in alcohol, ether and chloroform. It is split up by treatment with alkalies.

Example 2: 20 parts of pyridin are added while cooling to a mixture of 24 parts of dichlorid of methylene citric acid, 17 parts of amyl alcohol and 100 parts of benzene. When the reaction is finished the mixture is washed with acid to remove the pyridin and then with a sodium carbonate solution to remove the acid, the benzene solution is dried and the benzene distilled off.

The amyl ester crystallizes from ligroin in the shape of tasteless and odorless crystals melting at 52–55° C. It is soluble in alcohol, ether and chloroform, scarcely soluble in water and is split up by heating it with caustic alkalies.

The methylic ester is obtained in an analogous way. It melts at 76° C.

Having now described my invention and in what manner the same is to be performed, what I claim as new and desire to secure by Letters Patent is:—

1. The herein-described new alkyl esters of methylene citric acid, obtainable by esterification of methylene citric acid, and being white crystalline powders; being soluble in ether, alcohol and chloroform and being scarcely soluble in water, being split up by heating them with caustic alkalies; and exhibiting valuable therapeutic properties, substantially as hereinbefore described.

2. The herein-described amyl ester of methylene citric acid, obtainable by esterification of methylene citric acid, and being a white crystalline powder melting at 52 to 55° C., being soluble in ether, alcohol and chloroform and being scarcely soluble in water; being split up by heating it with caustic alkalies; and exhibiting valuable therapeutic properties, substantially as hereinbefore described.

In testimony whereof I have hereunto set my hand in the presence of two subscribing witnesses.

RUDOLPH BERENDES. [L. S.]

Witnesses:
  OTTO KÖNIG,
  WALTER EJLMETSKAMP.